United States Patent
Sato et al.

(10) Patent No.: US 8,519,318 B2
(45) Date of Patent: Aug. 27, 2013

(54) SOLID-STATE IMAGE SENSING DEVICE AND CONTROL METHOD OF THE SAME

(75) Inventors: Maki Sato, Yamato (JP); Satoshi Sakurai, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 305 days.

(21) Appl. No.: 13/052,187

(22) Filed: Mar. 21, 2011

(65) Prior Publication Data
US 2011/0248149 A1 Oct. 13, 2011

(30) Foreign Application Priority Data
Apr. 8, 2010 (JP) .................... 2010-089770

(51) Int. Cl.
*G01J 1/44* (2006.01)
(52) U.S. Cl.
USPC .................. 250/208.1; 250/214 P
(58) Field of Classification Search
USPC ........................... 250/208.1, 214 P
See application file for complete search history.

(56) References Cited

U.S. PATENT DOCUMENTS

| | | | |
|---|---|---|---|
| 4,591,708 A * | 5/1986 | Shu | .................. 250/221 |
| 6,803,958 B1 | 10/2004 | Wang | |
| 8,174,594 B2 * | 5/2012 | Koh | .................. 348/294 |
| 2006/0022862 A1 | 2/2006 | Egawa et al. | |
| 2010/0238335 A1 | 9/2010 | Sakurai | |

FOREIGN PATENT DOCUMENTS

| | | |
|---|---|---|
| CN | 1812508 A | 8/2006 |
| CN | 1905635 A | 1/2007 |

OTHER PUBLICATIONS

U.S. Appl. No.13/353,658, filed Jan. 19, 2012, Egawa.
Office Action issued Mar. 28, 2013 in Chinese Patent Application 201110068250.5 (with English translation—23 pages.

* cited by examiner

*Primary Examiner* — Tony Ko
(74) *Attorney, Agent, or Firm* — Oblon, Spivak, McClelland, Maier & Neustadt, L.L.P.

(57) ABSTRACT

According to one embodiment, a solid-state image sensing device for reading out, via an output circuit, a reset signal and a pixel signal from a pixel unit which performs photoelectric conversion includes a comparator which compares a signal read out from the pixel unit with a reference signal, a counter which counts clocks input until a pulse signal indicating a comparison result from the comparator is obtained, and a counter controller which prevents the counter from performing an operation of stopping pixel signal counting, based on an output result of the reset signal from the comparator.

18 Claims, 13 Drawing Sheets

Overall configuration example (first embodiment)
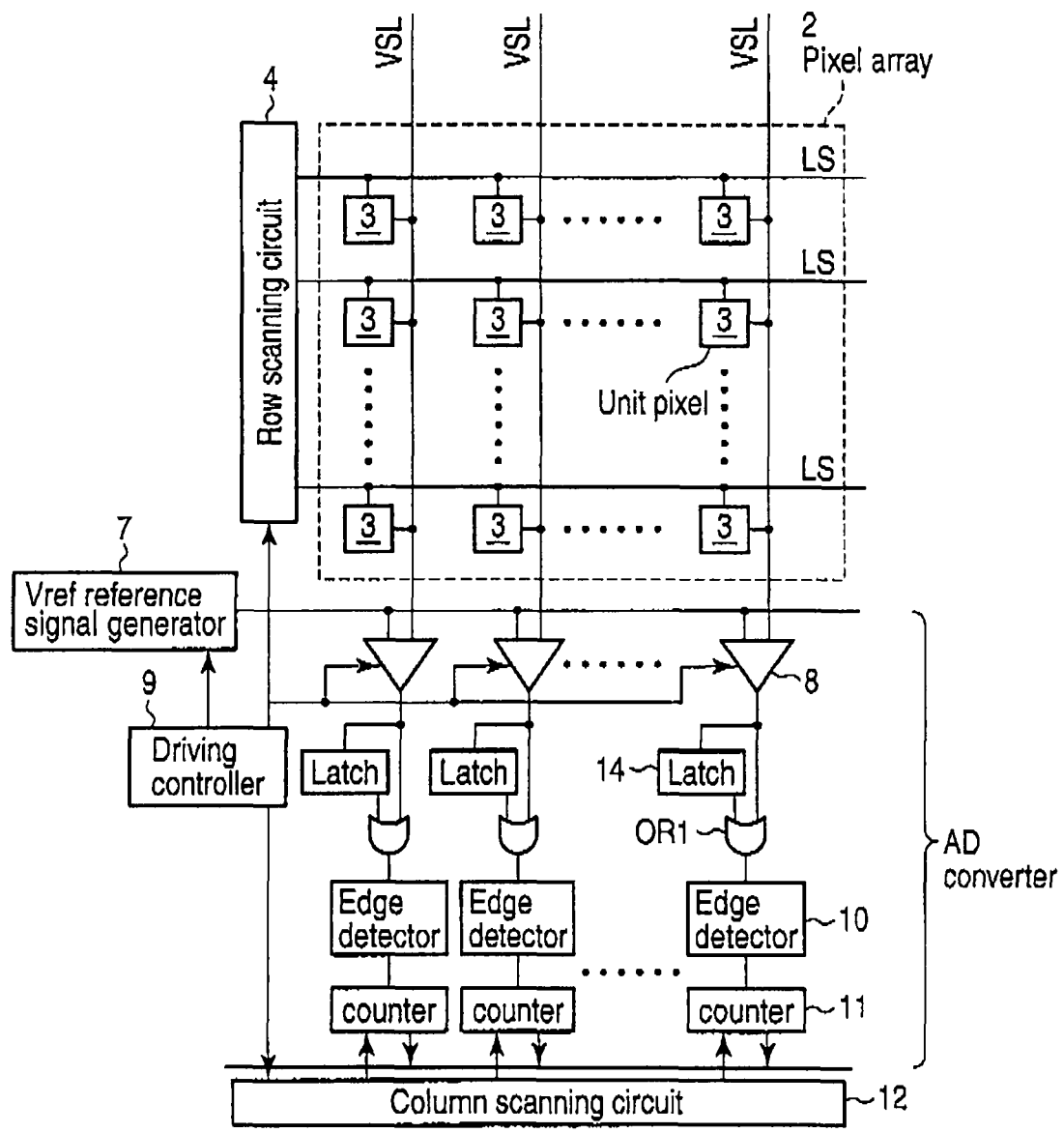
F I G. 1

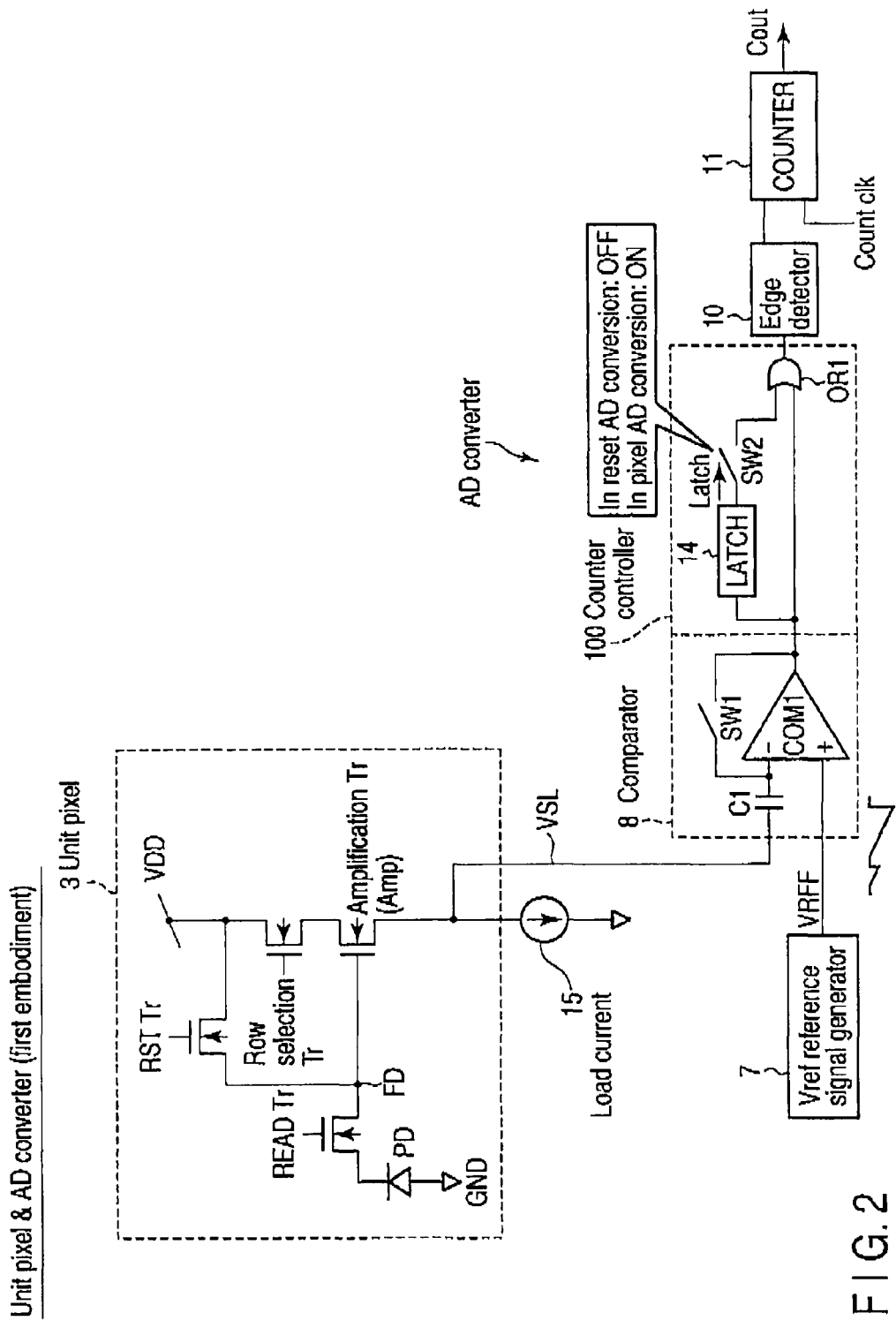
F I G. 2

Count range of counter 11

| Full count range of reset signal | Pixel signal | Range after CDS |
|---|---|---|
| 255LSB+redundancy range (determination threshold margin) | 1023LSB+255LSB+redundancy range (determination threshold margin) | 1023LSB |

F I G. 4

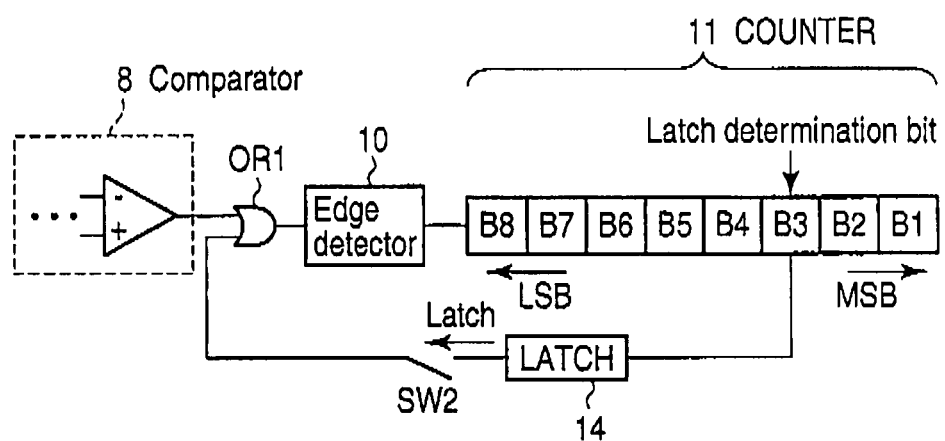
F I G. 8

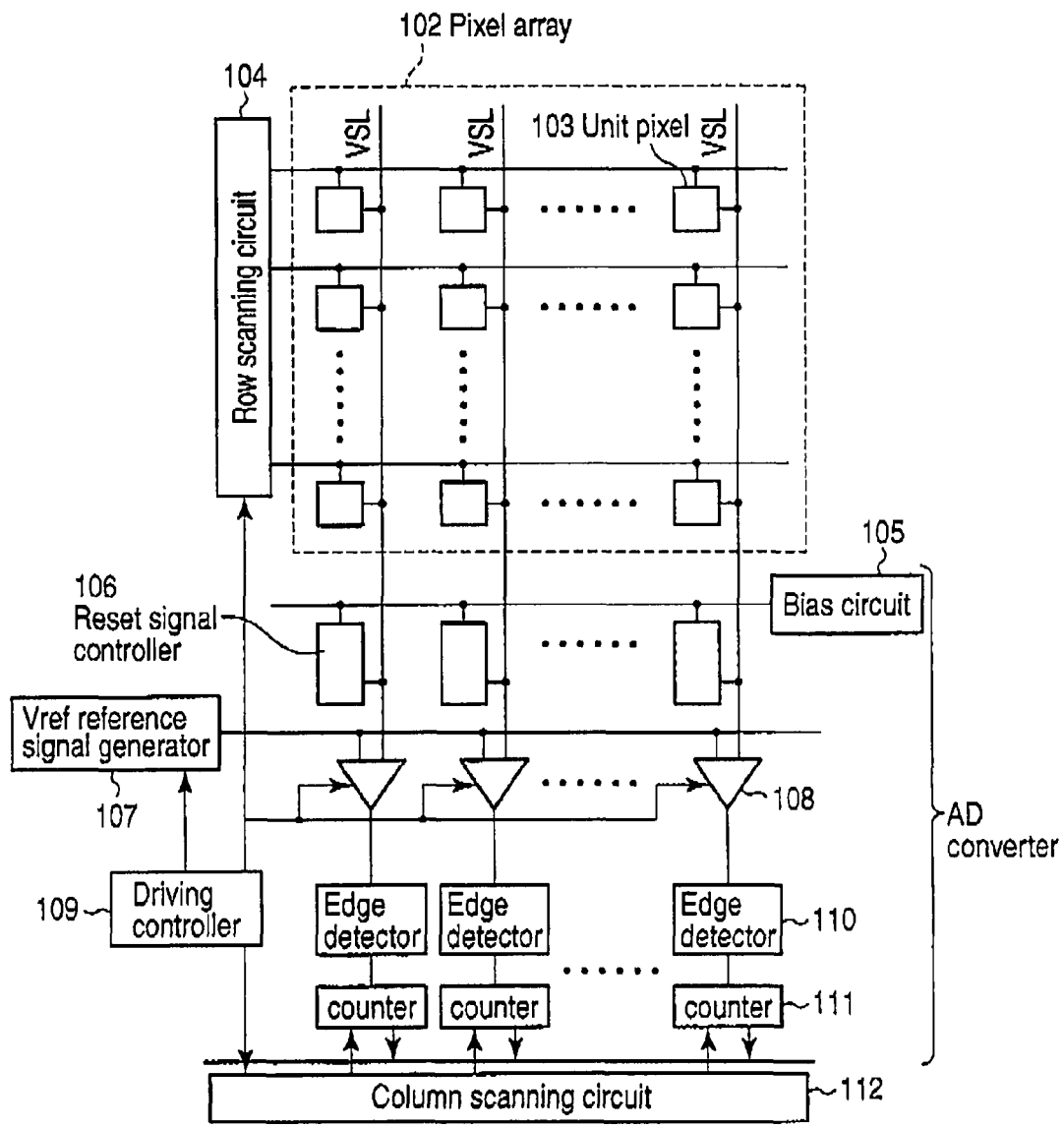
F I G. 10

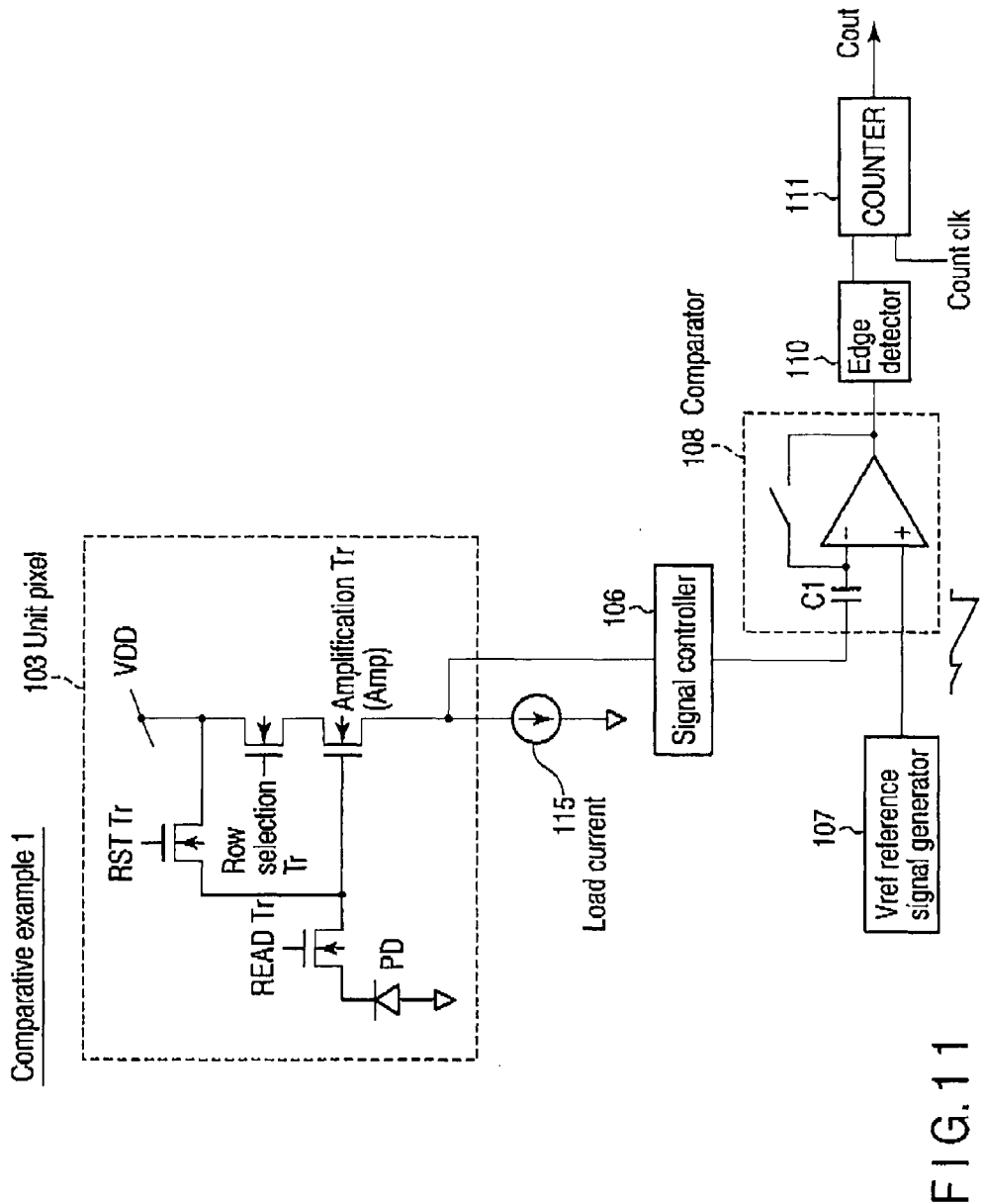
F I G. 11

SOLID-STATE IMAGE SENSING DEVICE AND CONTROL METHOD OF THE SAME

CROSS-REFERENCE TO RELATED APPLICATIONS

This application is based upon and claims the benefit of priority from Japanese Patent Application No. 2010-089770, filed Apr. 8, 2010; the entire contents of which are incorporated herein by reference.

FIELD

Embodiments described herein relate generally to, e.g., a solid-state image sensing device and its control method.

BACKGROUND

When intense excessive light enters a solid-state image sensing device such as a CMOS image sensor, a reset potential decreases, and a whole image darkens. U.S. Pat. No. 6,803,958 is disclosed as an example of a proposal for preventing this.

When very intense excessive light enters in the above-mentioned proposal, the potential of a vertical signal line (VSL) at the time of reset level acquisition is monitored, and signal control is performed before a pixel signal undergoes analog-to-digital (AD) conversion.

In the arrangement and control described above, however, it is necessary to use a control circuit for controlling a pixel signal transferred from the vertical signal line (VSL), and a bias circuit for determining the threshold value of a pixel signal to be input to the control circuit, or a signal control comparator. This is disadvantageous in that the circuit layout area increases. This tendency is more significant in, e.g., a micro-pixel parallel read type sensor because these circuits must be added to each column.

BRIEF DESCRIPTION OF THE DRAWINGS

FIG. 1 is a block diagram showing an example of the overall configuration of a solid-state image sensing device according to the first embodiment;

FIG. 2 is an equivalent circuit diagram showing a unit pixel and an AD converter in a column scanning circuit shown in FIG. 1;

FIG. 4 is a view showing the counter range of a counter according to the first embodiment;

FIG. 8 is a view showing a configuration example of a counter shown in FIG. 7;

FIG. 10 is a block diagram showing an example of the overall configuration of a solid-state image sensing device according to Comparative Example 1;

FIG. 11 is an equivalent circuit diagram showing a unit pixel and an AD converter in a column scanning circuit according to Comparative Example 1;

DETAILED DESCRIPTION

Figure 3:
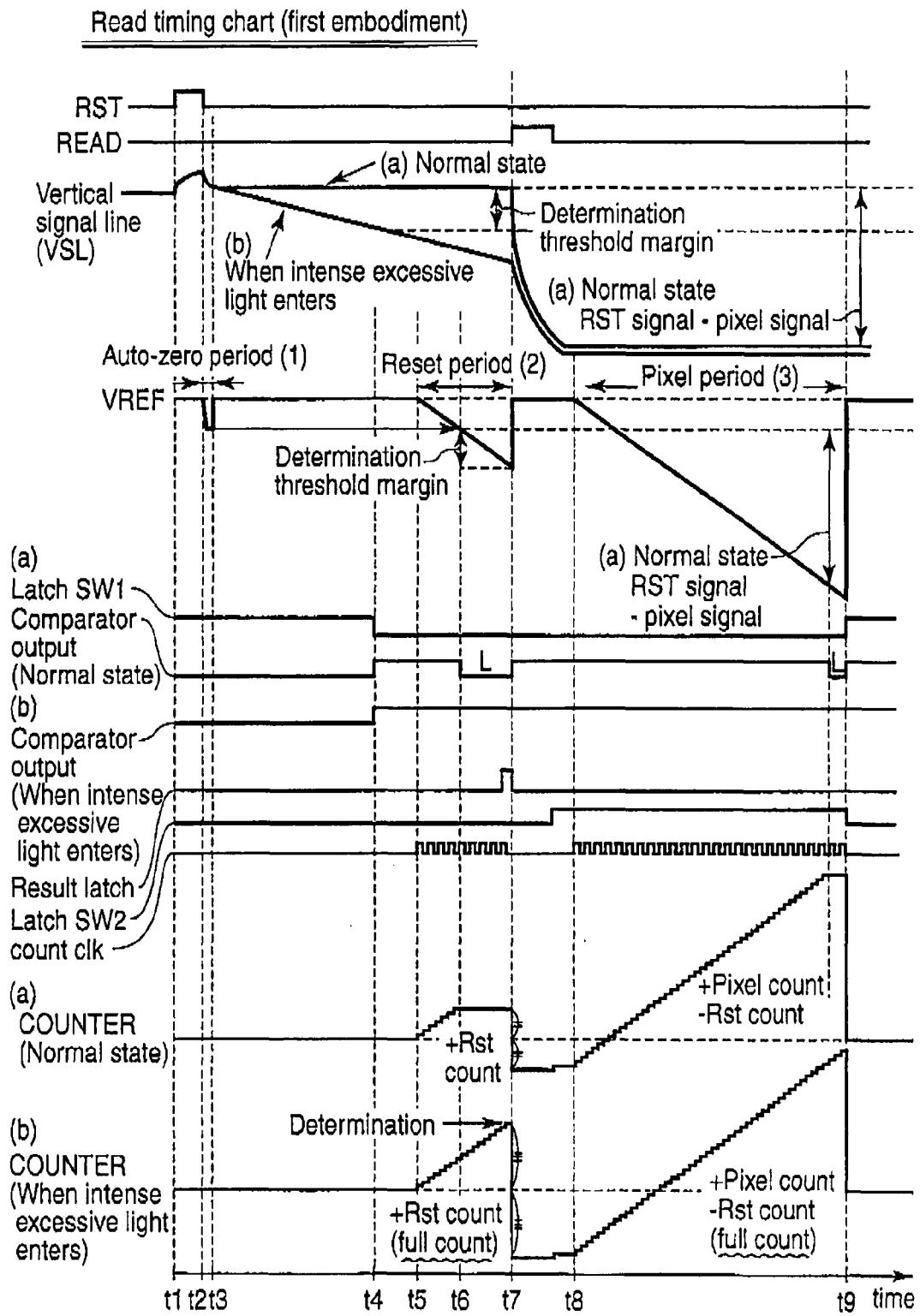
FIG. 3 is a timing chart showing a read control operation of the solid-state image sensing device according to the first embodiment.

In general, according to one embodiment, a solid-state image sensing device for reading out, via an output circuit, a reset signal and a pixel signal from a pixel unit which performs photoelectric conversion includes a comparator which compares a signal read out from the pixel unit with a reference signal, a counter which counts clocks input until a pulse signal indicating a comparison result from the comparator is obtained, and a counter controller which prevents the counter from performing an operation of stopping pixel signal counting, based on an output result of the reset signal from the comparator.

Embodiments will be explained below with reference to the accompanying drawing. Note that in this explanation, the same reference numerals denote the same parts throughout the drawing.

First Embodiment

First, a solid-state image sensing device and its control operation according to the first embodiment will be explained below with reference to FIGS. 1, 2, 3, 4, 5, and 6.

1. Configuration Example

1-1. Overall Configuration Example

First, an example of the overall configuration of the solid-state image sensing device according to the first embodiment will be explained with reference to FIG. 1.

As shown in FIG. 1, the solid-state image sensing device according to this embodiment includes a pixel array 2, a row scanning circuit 4, a Vref reference signal generator 7, comparators 8, a driving controller 9, edge detectors 10, counters 11, a column scanning circuit 12, latch circuits 14, and OR circuits OR1.

The pixel array (Pixel array) 2 includes a plurality of unit pixels (Pixel) 3 arranged in a matrix at the intersections of vertical signal lines VSL and row lines LS. The unit pixels 3 are scanned row-by-row by the row scanning circuit 4, and pixel signals are sequentially supplied to the comparators 8.

The row scanning circuit 4 selects a row line LS under the control of the driving controller 9.

The Vref reference signal generator 7 generates a reference signal for referring to a reference voltage Vref, and outputs the reference signal to the comparator 8. The reference signal is a signal that sequentially changes its level at a predetermined rate.

The comparator 8 compares a pixel signal obtained by the pixel array 2 with the reference signal as a comparison target that changes its value step-by-step.

The edge detector 10 detects a level at which the pixel signal and the comparison result obtained by the comparator 8 are inverted.

The counter 11 functions as an analog-to-digital converter that outputs, as a digital value, a time quantity with which the comparator 8 switches the magnitudes of the pixel signal and reference signal.

The column scanning circuit 12 selects a vertical signal line VSL as a column line and reads out a digital value from it under the control of the driving controller 9.

The latch circuit 14 temporarily latches the output signal from the comparator 8.

The OR circuit OR1 outputs the logical sum (OR) of the output from the comparator 8 and the output from the latch circuit 14 to the edge detector 10.

The driving controller 9 controls the row scanning circuit 4, Vref reference signal generator 7, comparators 8, and column scanning circuit 12, thereby controlling the whole operation of this solid-state image sensing device having the above arrangement.

Note that the OR circuit OR1 is taken as an example of a logic circuit in this embodiment, but the logic circuit is not limited to an OR circuit.

Data Read Operation (Digital CDS Method)

Next, a data read operation of the solid-state image sensing device according to this embodiment will briefly be explained below. The operation will be explained by taking a series of digital CDS AD conversion processes as an example.

First, the unit pixel (Pixel) 3 transmits a reset signal to the comparator 8 through the vertical signal line (VSL). Then, the reference signal (VREF) is supplied to the comparator 8, and the counter counts (measures) clock signals until a pulse signal indicating a comparison result from the comparator 8 is obtained.

Subsequently, the reset signal count is held, pixel signals are similarly acquired, and the counter 11 counts the signals, and converts them into digital data.

After that, a difference calculating process (CDS) of calculating the difference between the AD conversion result of the reset level and that of the signal level is executed. Digital data of a signal component indicated by this difference between the reset level and pixel signal level is finally output as a pixel signal.

1-2. Configuration Examples of Unit Pixel and AD Converter

Configuration examples of the unit pixel 3 and an AD converter shown in FIG. 1 will be explained below with reference to FIG. 2.

As shown in FIG. 2, the unit pixel 3 according to this embodiment includes a photodiode PD, read transistor READ Tr, reset transistor RST Tr, amplification transistor AMP Tr, and row selection transistor Tr.

The photodiode PD performs photoelectric conversion of converting an optical signal into an electric signal, and has an anode connected to a ground power supply GND, and a cathode connected to one end of the current path of the read transistor READ Tr.

The read transistor READ Tr reads out the electric charge of the photodiode PD to a floating diffusion (FD). The other end of the current path of the read transistor READ Tr is connected to the floating diffusion FD.

The reset transistor RST Tr resets the voltage of the floating diffusion FD. The current path of the reset transistor RST Tr has one end connected to the floating diffusion FD, and the other end connected to an internal power supply voltage VDD.

The row selection transistor Tr performs row selection. The other end of the current path of the row selection transistor Tr is connected to the internal power supply voltage VDD.

The amplification transistor AMP Tr outputs the voltage of the floating diffusion FD, and has a gate connected to the floating diffusion FD. The current path of the amplification transistor AMP Tr has one end connected to one end of the current path of the row selection transistor Tr, and the other end connected to one terminal of a load current 15 and the vertical signal line VSL. The other terminal of the load current 15 is connected to the ground power supply GND.

As described above, the end of the vertical signal line VSL is connected to the load current 15. The load current 15 and amplification transistor AMP Tr form a source follower circuit, and read out a pixel signal.

The AD converter includes the Vref reference signal generator 7, the comparator 13, a counter controller 100 (the latch circuit 14, a switch SW2, and the OR circuit OR1), the edge detector 10, and the counter 11.

The Vref reference signal generator 7 outputs the reference voltage VREF to the comparator B.

The comparator 8 includes a capacitor C1, switch SW1, and comparator COM1, and compares an input pixel signal from the unit pixel 3 with the reference voltage VREF. The capacitor C1 has one electrode connected to the unit pixel 3, and the other electrode connected to the (−) input of the comparator COM1.

The switch SW1 is an auto-zero switch. The switch SW1 is turned on during an auto-zero period, and the reference voltage of the comparator is acquired during this ON period.

The reference voltage VREF is input to the (+) input of the comparator COM1.

The counter controller 100 includes the latch circuit 14, switch SW2, and OR circuit OR1, and controls the counter 11 so as not to perform an operation of stopping the pixel signal counting, based on the reset signal output result from the comparator 8. Details will be described later.

The latch circuit (LATCH) 14 detects whether the comparator 8 is inverted, and has an input connected to the comparator 8, and an output connected to one terminal of the switch SW2.

The other terminal of the switch (latch output controller) SW2 is connected to the input of the OR circuit OR1. The driving controller 9 or the like controls the switch SW2 such that it is turned off during a reset period and turned on during a pixel AD period in which a pixel signal undergoes AD conversion. This is so in order to hold, in the latch circuit 14, whether the comparator 8 is inverted/not inverted during a reset AD acquisition period in which a reset signal undergoes AD conversion. That is, the switch SW2 is turned on during the pixel AD period, and, even if the comparator 8 is inverted early in the pixel AD period, the logic with a signal latched in the reset AD acquisition period is acquired, thereby preventing edge detection.

The input of the OR circuit (logic circuit) OR1 is further connected to the output of the comparator 8 and the input of the latch circuit 14. The output of the OR circuit OR1 is connected to the input of the edge detector 10.

The output of the edge (EDGE) detector 10 is connected to the input of the counter 11.

Counter clocks (count clk) are input to the input of the counter (COUNTER) 11, and the counter 11 outputs a counter output Cout.

In this embodiment as described above, the latch circuit 14 is installed after the output of the comparator 8, and before the input of the edge detector 10.

If very intense excessive light enters in Comparative Example 1 (to be described later), the potential of the vertical signal line VSL at the time of reset signal level acquisition is monitored, and controlled in an analog manner, thereby performing signal control before a pixel signal undergoes AD conversion.

In the above-mentioned arrangement according to this embodiment, however, a redundancy is given to a reference signal integration period during the reset signal detection period, and to a reset counter range. In addition, the latch circuit 14 detects whether the comparator 8 is inverted, and, if the comparator 8 is not inverted because the reset signal (RST) drops, holds a latch signal indicating that the comparator 8 is not inverted. A logic signal of the output result from the comparator and the result held in the latch circuit enters the input of the edge detector. The latch circuit includes an ON/OFF switch that is turned off when reading out a reset signal, and turned on when reading out a photodiode signal. If the latch signal indicating that the comparator 8 is not inverted is held when reading out the reset signal, the counter 11 is forced to output a full pixel (PD) count during AD conversion (a CDS operation). In the above-mentioned control, the driving controller 9 controls switching of the switch SW2.

This makes it possible to output the full count for both the reset level AD conversion result and pixel signal level AD conversion result. Since the full count is finally output as a signal after the difference calculating process (CDS) of calculating the difference between the reset level AD conversion result and pixel signal level AD conversion result, the problem of image darkening can be avoided. Details will be described later.

In addition, the arrangement according to this embodiment does not require, e.g., a bias circuit for controlling the vertical signal line, a reset signal controller, and a signal control comparator, unlike Comparative Examples 1 and 2 (to be described later). This is advantageous for downsizing because the increase in circuit scale can be prevented.

2. Read Control Operation

A read control operation of the solid-state image sensing device according to this embodiment will now be explained with reference to FIGS. 3, 4, and 5. The explanation will be made based on a timing chart shown in FIG. 3. FIG. 3 shows a view for explaining the reference voltage VREF and the potential of the vertical signal line (VSL), a pulse timing chart, normal state (a), and state (b) in which very intense excessive light enters, by superposing them on each other in a single drawing.

In the control operation of this embodiment, the potential of the vertical signal line VSL is not controlled even when very intense excessive light enters (state (b)). On the other hand, when very intense excessive light enters (state (b)) in the comparative examples (to be described later), control is performed such that the potential of the vertical signal line VSL does not fall below a given correction threshold voltage, because a pixel reset signal drops.

First, at time t1, a reset pulse RST is changed to "H" level, and the reset transistor RST Tr is turned on.

A reset signal read out from the unit pixel 3 in an effective image sensing region is read out to the vertical signal line VSL. Consequently, the potential of the vertical signal line VSL decreases from time t2. Also, at time t2, auto-zero integration is started by dropping the reference voltage VREF, and the reference voltage of the comparator 8 is acquired (auto-zero).

Subsequently, at time t3, the reference voltage VREF is reset to "H" level, thereby terminating auto-zero period (1). In this step, control is performed to start auto-zero immediately after the reset pulse RST rises so as not to produce any large difference between the zero standards of auto-zero in normal state (a) and state (b) in which very intense excessive light enters.

At time t4, the auto-zero switch SW1 is turned off. At the same time, the comparator output changes to "H" level to start a CDS operation.

At time t5, reset integration is started by dropping the reference voltage VREF. At the same time, the counter 11 starts counting (measuring) counter clocks (count clk). The ON/OFF switch SW2 of the latch circuit is turned off when reading out the reset signal.

At time t6 in normal state (a), the floating diffusion FD is shielded, and there is almost no potential fluctuation. Accordingly, a voltage almost equal to that of the signal acquired during auto-zero period (1) is read out as the reset signal to the vertical signal line VSL. When the vertical signal line VSL becomes almost equal to the reference voltage VREF, therefore, the comparator 8 is inverted, and the edge detector 10 detects the edge of the inversion. This enables the counter 11 to count (measure) clocks (count clk) until that time, thereby determining the reset count.

If very intense excessive light enters (state (b)), however, the voltage of the reset signal of the vertical signal line VSL keeps dropping even during reset level detection period (2). Accordingly, the comparator 8 may not be inverted until the end (time t7) of reset level detection period (2).

In this embodiment, therefore, the reference signal integration period is prolonged beforehand at the time of reset counting, the counter range is given a redundancy corresponding to a determination threshold margin, and the latch circuit 14 detects whether the comparator 8 is inverted. If the comparator 8 is not inverted, the latch circuit 14 holds a latch signal indicating that the comparator is not inverted.

With respect to this reset count target value, a reset full (MAX) count (range) is determined by taking account of the noise of the amplification transistor AMP Tr in the unit pixel 3, the offset of the comparator 8, and the delay, such that variations fall within the range of the reset full count corresponding to reset count period (2). In this embodiment, a reference voltage VREF reset count time (count) is given a redundancy larger than that of the reset full count. A voltage corresponding to the reset count time between the reset count target value and the count given the redundancy is the determination threshold voltage margin shown in FIG. 3.

That is, if the comparator 8 is not inverted, counting is continued till time t7, and the reset full (MAX) count containing the redundancy, i.e., the normal full count or more is output.

When the reset signal is determined at time t7 in normal state (a), the reference voltage VREF is returned to the reset voltage level, and the comparator 8 is returned to the original non-inverted state ("H" level).

After that, the reset count is converted into a negative reset count by inverting signals of all bits of the (binary) counter 11, and this count is used as an initial count.

Subsequently, the latch SW2 is turned on before the photodiode signal is read out, i.e., before time t8, and the latch signal held in the latch circuit is reflected on pixel period (3) as a photodiode signal AD conversion period.

At time t8, pixel integration is started by dropping the reference voltage VREF.

As in reset period (2) described above, the comparator 8 compares a pixel (PD) signal in the period (pixel period (3))

between times t8 and t9 with the reference signal VREF, and the counter 11 counts clocks input until the time of inversion of the comparator 8 from the above-mentioned initial count, thereby terminating this operation.

If the comparator is not inverted and the latch signal is output as a reset signal when detecting the reset level, the full count of the counter is output when detecting a pixel.

That is, in this state, the difference calculating process (CDS) of calculating the difference between the reset level AD conversion result and pixel signal level AD conversion result is performed. If the comparator 8 is not inverted and the latch circuit 14 is holding the latch signal when detecting the reset level, a full pixel (PD) count is output by taking this latch signal into account, even when the comparator 8 is inverted during the pixel signal AD period. Consequently, a full signal is finally output after a difference calculating process (CDS).

Assume, as shown in FIG. 4, that the full (MAX) count range of the reset signal is 255 LSB, and the full (MAX) count range of the pixel signal is 1023 LSB+255 LSB, as examples of the count range of the counter 11 described above. In this case, the final full count of the difference signal obtained after CDS is performed on the reset level AD conversion result and pixel signal level AD conversion result is (1023 LSB+255 LSB)−255 LSB=1023 LSB.

In this embodiment, the count of the reset signal is made more redundant than the full (MAX) count range (255 LSB) in advance. In other words, as shown in FIG. 4, the full (MAX) count range of the reset signal is set to (255 LSB+redundant range (determination threshold margin)), and the full (MAX) count range of the pixel signal is set to (1023 LSB+255 LSB+redundant range (determination threshold margin)). If the latch signal indicating that the comparator 8 is not inverted during the reset signal AD period is output, no edge is determined by calculating the logical sum with the latch signal even when the comparator 8 is inverted during the pixel signal AD period. After that, the count is forcedly increased to the pixel signal full count containing the redundancy. Consequently, the final difference signal obtained after CDS is performed on the reset level AD conversion result and pixel signal level AD conversion result is 1023 LSB.

Furthermore, the digital CDS method disclosed in this embodiment is an example, and any digital CDS method can be used as long as the digital data value of a signal component indicated by the difference between the reset level and signal level can be obtained.

Counter Value when Analog Gain of Reference Voltage (VREF) Changes

The counter value when the analog gain of the reference voltage (VREF) changes in the above-mentioned read control operation will be explained below with reference to FIG. 5.

Figure 5:
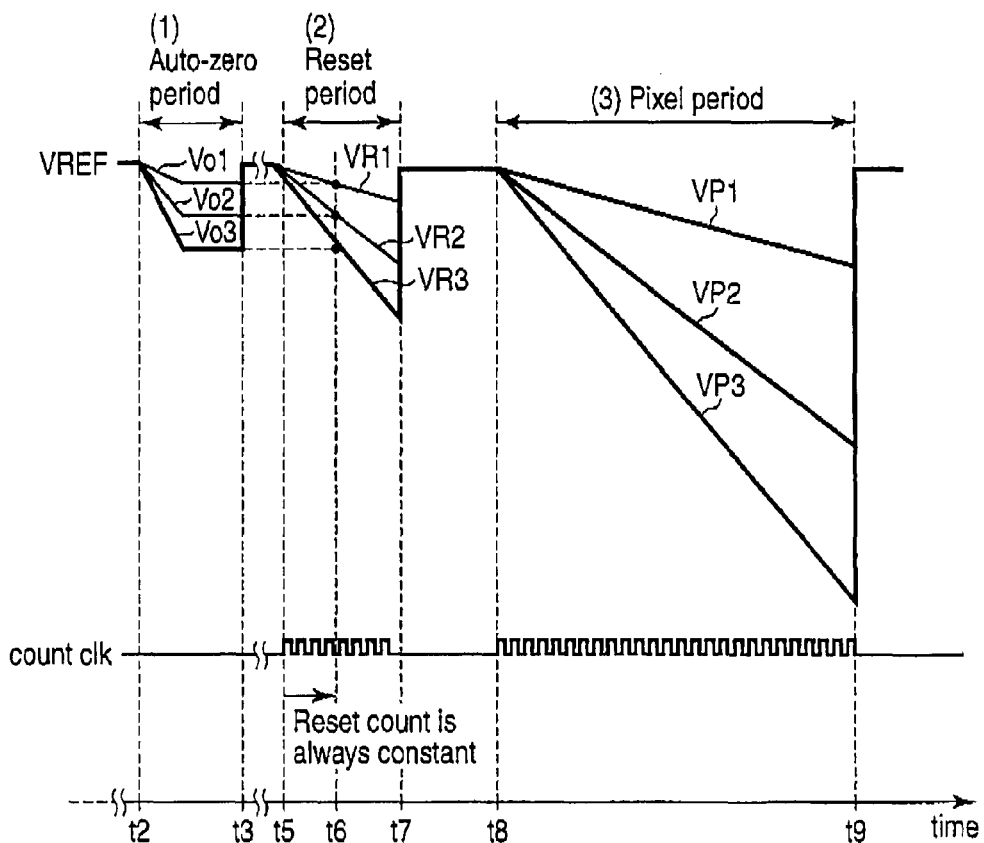
FIG. 5 is a timing chart showing a state in which the analog gain of a reference voltage changes in FIG. 3.

As indicated by times t5 to t7 shown in FIG. 5, the output digital count of auto-zero (reset AD conversion period (2)) can always be held constant even when the analog gain changes. Therefore, the reset level output value can be matched with the digital target value.

With respect to this reset level output target value, the reset full count is determined by taking account of the noise of the AMP Tr of a pixel cell, the offset of the comparator, and the delay, such that variations fall within the range of the reset full count corresponding to the reset signal count time.

For example, when the output target value of the reset signal level is 128 LSB and the full count range of the reset signal is 256 LSB as shown in FIG. 4, even the variations from the reset level output target value can be settled within the count range.

3. Effects

The solid-state image sensing device and its control operation according to this embodiment achieves at least effects (1) and (2) described below.

(1) Darkening Caused by a Reset Potential Drop can be Prevented.

In the comparative examples (to be described later), if very intense excessive light enters a CMOS sensor that counts clocks input within a given time and converts a pixel signal into digital data, signal control is performed before AD conversion of the pixel signal by a method of controlling the potential of the vertical signal line in an analog manner so as not to drop the reset signal.

This embodiment, however, includes the counter 11 having the VREF reset time (count) given a redundancy (redundant range) larger than that of the reset full count estimated from the reset level output target value. If very intense excessive light enters and the comparator 8 is not inverted when detecting the reset signal, the latch circuit 14 holds a latch signal indicating that the comparator 8 is not inverted, and the counter is forced to output a full pixel (PD) count during AD conversion (CDS processing) by taking account of this latch signal even when the comparator 8 is inverted during the pixel signal AD period. For example, as shown in FIG. 4, the counter 11 is forced to finally output 1023 LSB as the difference signal after CDS.

As described above, the arrangement and control operation according to this embodiment are advantageous in that it is possible to output a full count or more as the signal after the difference calculating process (CDS) of calculating the difference between the reset level AD conversion result and pixel signal level AD conversion result, and prevent the problem that an image darkens when very intense excessive light enters.

(2) The Embodiment is Advantageous for Downsizing.

Compared to the comparative examples (to be described later), this embodiment requires the addition of only the latch circuit 14, and can perform pixel signal processing during CDS by using the digital CDS comparator and counter. This obviates the need for, e.g., a reset signal controller for controlling a pixel signal transferred from the vertical signal line VSL, and a bias circuit for determining the threshold value of a pixel signal. This is advantageous for downsizing because the increase in circuit layout area can largely be suppressed.

[Modification 1 (Example Further Including Reset Signal Controller)]

A solid-state image sensing device and its control operation according to Modification 1 of the above-mentioned first embodiment will be explained below with reference to FIG. 6. This modification is directed to an example further including reset signal controllers 106. In this explanation, a repetitive explanation of the first embodiment will be omitted.

Configuration Example

Although details are not shown, this embodiment differs from the first embodiment in that the reset signal controllers 106 shown in FIG. 10 are installed between a pixel array 10 and AD converter.

<Read Control Operation>

A read control operation of the solid-state image sensing device according to this modification will be explained below with reference to a timing chart shown in FIG. 6. FIG. 6 shows a view for explaining a reference voltage VREF and the potential of a vertical signal line (VSL), a pulse timing chart, normal state (a), and state (b) in which very intense excessive light enters, as by superposing them on each other in a single drawing.

Figure 6:
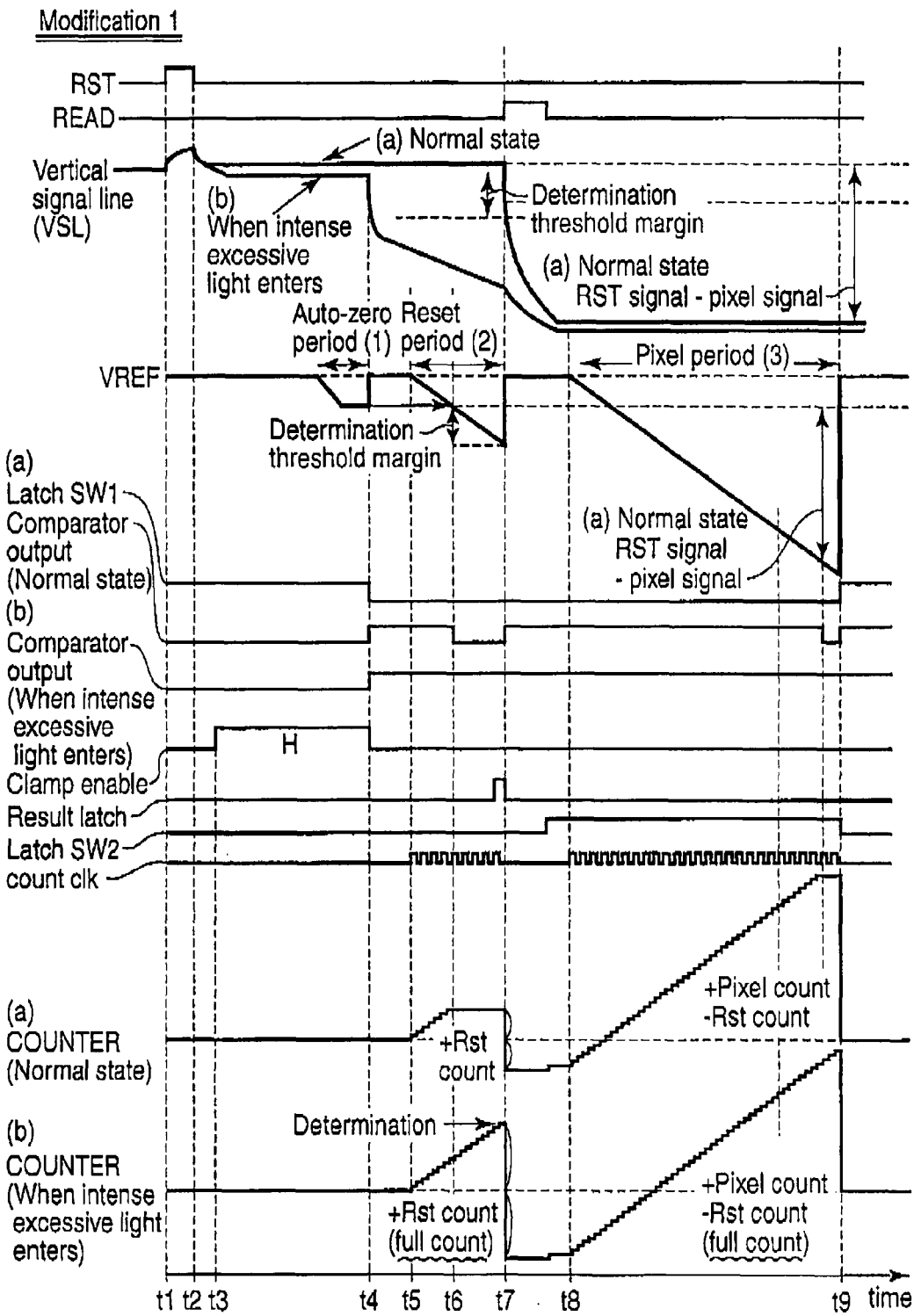
FIG. 6 is a timing chart showing a read control operation of a solid-state image sensing device according to a modification.

As shown in FIG. 6, if very intense excessive light enters (state (b)) at time t2, a pixel reset signal drops. If this drop of the reset signal is very large, a large difference is produced between auto-zero (reset) signal levels in normal state (a) and state (b) in which very intense excessive light enters. As a consequence, the reference potential of a comparator may change.

To solve this problem, therefore, this embodiment applies a combination of the reset signal controllers 106 shown in FIG. 10 and the arrangement according to the first embodiment between the pixel array 10 and AD converter.

In this arrangement as shown in FIG. 6, at time t1, a reset pulse rises, and a reset signal of a floating diffusion portion is supplied to the vertical signal line VSL.

Subsequently, at time t2, the reset signal controller 106 holds a clamp enable signal at "H" level, so that the potential of the vertical signal line VSL does not fall below a predetermined reference threshold voltage during an auto-zero (reset) signal detection period. This makes it possible to clamp the potential of the vertical signal line VSL, and acquire an auto-zero (reset) signal.

After that, the same control operation as that of the first embodiment is performed.

As described above, the arrangement of Modification 1 is applicable as needed.

Second Embodiment

Example in which Determination is Performed by Given Bit of Counter

A solid-state image sensing device and its control operation according to the second embodiment will be explained below with reference to FIGS. 7, 8, and 9. In the first embodiment, determination is performed based on whether the comparator 8 is inverted. The second embodiment differs from the first embodiment in that determination is performed based on whether a given bit of a counter 11 rises (based on a counter result). In this explanation, a repetitive explanation of the above-mentioned first embodiment will be omitted.

Configuration Example

First, a configuration example according to this embodiment will be explained with reference to FIGS. 7 and 8.

Figure 7:
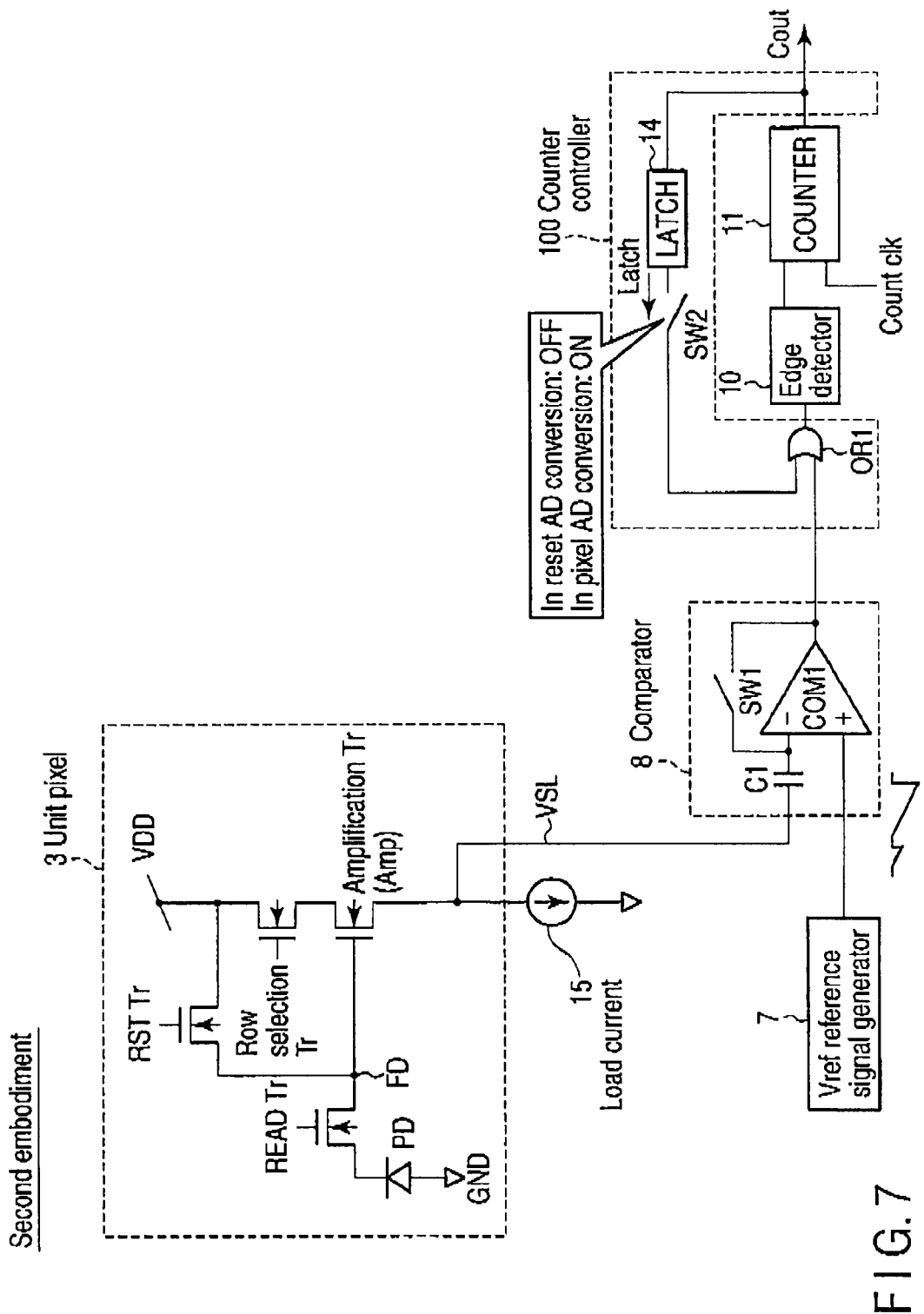
FIG. 7 is an equivalent circuit diagram showing a unit pixel and an AD converter in a column scanning circuit according to the second embodiment.

As shown in FIG. 7, the configuration example of this embodiment differs from the first embodiment in that the input of a latch circuit 14 is connected to the output of the counter 11. In addition, the arrangement of the counter 11 is different as shown in FIG. 8.

Configuration Example of Counter 11

FIG. 8 is a conceptual view of counter bits of the counter 11. As shown in FIG. 8, the counter 11 outputs a latch signal when a given bit of the counter 11 changes to "1" during a reset signal detection period, and the latch circuit holds this latch signal. In this case, a pixel (PD) count is forcedly converted into a full count by taking this latch signal into account, even when a comparator 8 is inverted during a pixel signal AD period. Consequently, a full signal is finally output after a difference calculating process (CDS).

Figure 9:
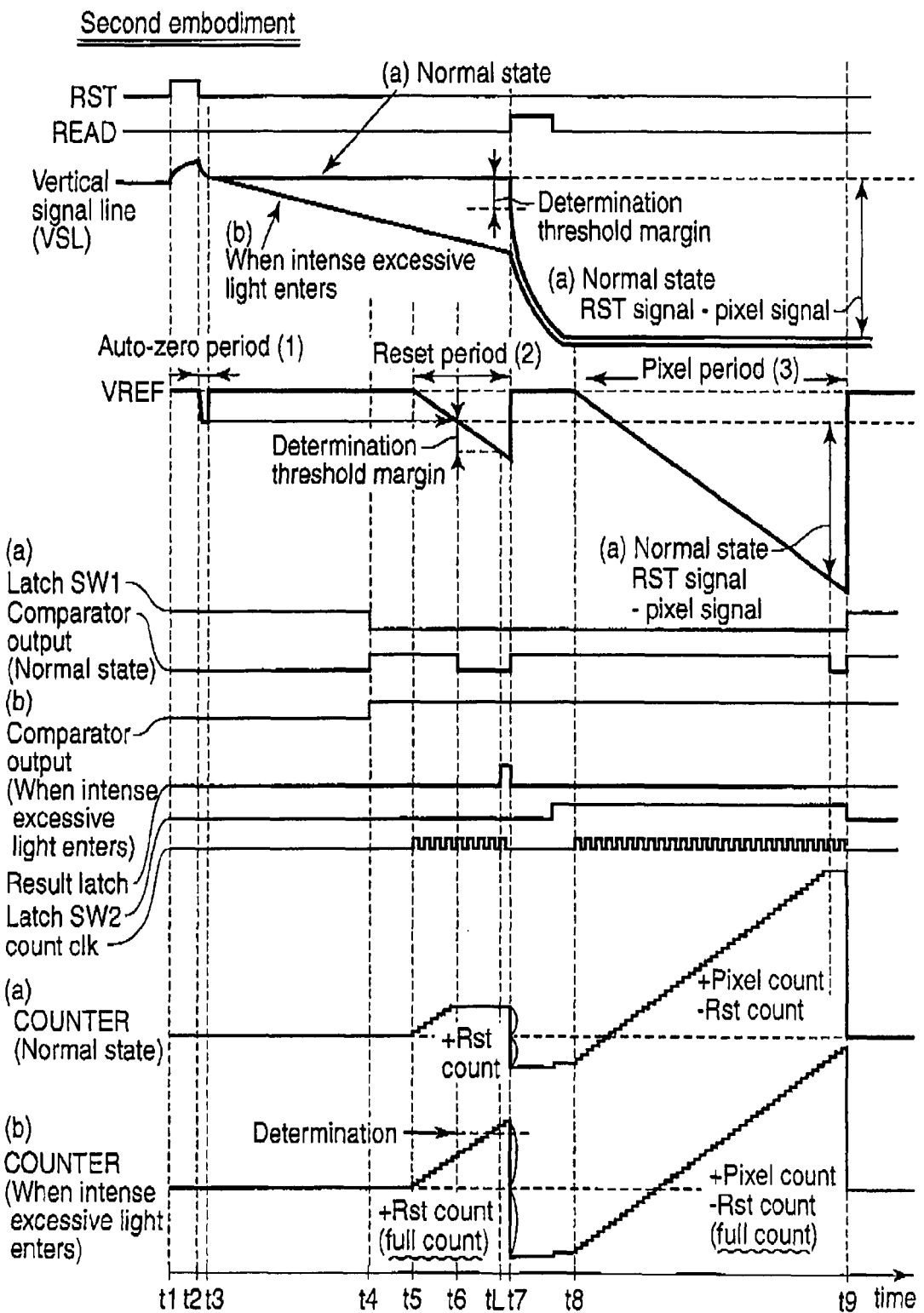
FIG. 9 is a timing chart showing a read control operation of a solid-state image sensing device according to the second embodiment.

The time at which a counter latch determination bit rises in FIG. 8 corresponds to time tL in FIG. 9.

As described above, the arrangement of the solid-state image sensing device according to the second embodiment is advantageous for downsizing because, as in the first embodiment, the device does not require, e.g., a signal controller for a vertical signal line VSL, a bias circuit for the signal controller, and a signal control comparator, and requires the addition of only the latch circuits 14. If the comparator is not inverted when detecting a reset signal, control is performed to forcedly output a full pixel (PD) count at the time of AD conversion (CDS processing). This makes it possible to output a full (MAX) count as a signal after the difference calculating process (CDS), and prevent the problem that an image darkens when very intense excessive light enters.

<Read Control Operation>

A read control operation of the solid-state image sensing device according to this embodiment will be explained below with reference to FIG. 9. In this explanation, a view for explaining a reference voltage VREF and the potential of the vertical signal line (VSL), a pulse timing chart, normal state (a), and state (b) in which very intense excessive light enters are superposed on each other in a single drawing.

When very intense excessive light enters (state (b)), the potential of the vertical signal line VSL is not controlled in the second embodiment as well.

As shown in FIG. 9, at times t2 and t3, a reset signal is acquired by auto-zero, and the reference potential of the comparator 8 is acquired, in the same manner as described previously. In this step, in order not to produce any large difference between the zero standards of auto-zero in normal state (a) and state (b) in which very intense excessive light enters, the comparator 8 acquires the reset signal by auto-zero immediately after a reset pulse RST rises.

Subsequently, at time t4, an auto-zero switch SW1 is turned off. At the same time, the comparator output changes to "H" level to start a CDS operation.

At time t5, reset integration is started. In normal state (a), a floating diffusion portion (FD) is shielded, and there is almost no potential fluctuation. Therefore, a voltage almost equal to that acquired during auto-zero is output as the reset signal, and the comparator 8 is inverted. A reset count is determined by counting (measuring) clocks until that time by the counter 11.

If very intense excessive light enters (state (b)) in this case, however, the reset signal of the vertical signal line VSL keeps dropping even during the reset level detection period. Consequently, the comparator 8 may not be inverted before the end (time t7) of the reset level detection period. Therefore, this embodiment includes the latch circuit 14 for detecting whether a given determination bit of the counter 11 has risen while the reset count is measured (during the period from time t5 to time t7). If the given determination bit of the counter rises, a latch signal is output and held in the latch circuit 14. In this embodiment, for example, if the given determination bit of the counter rises immediately before time t7, the latch circuit 14 holds a bit determination signal at that time.

Also, if very intense excessive light enters (state (b)) in this embodiment, the comparator is not inverted, so a full (MAX) reset count is output as the reset signal.

When the reset signal is determined at time t7 in normal state (a), the reference voltage VREF is returned to the reset voltage level, and the comparator 8 is returned to the original non-inverted state ("H" level).

After that, the reset count is converted into a negative reset count by inverting signals of all bits of the (binary) counter 11, and this count is used as an initial count.

Subsequently, the latch SW2 is turned on before the photodiode signal is read out, i.e., before time t8, and the latch signal held in the latch circuit is reflected on pixel period (3) as a photodiode signal AD conversion period.

In the above-mentioned read control operation according to this embodiment, with respect to this reset count target value, a voltage corresponding to the reset count time between the reset count target value and the count at which the determination bit rises is the determination threshold voltage margin shown in FIG. 9. That is, the given bit of the counter 11 is a determination criterion for determining whether to perform digital clamp control by using the count.

Then, at time t8, pixel integration is started by dropping the reference voltage VREF, and the comparator 8 similarly compares a pixel (PD) signal with the reference signal. Clocks input until the time of inversion of the comparator are counted from the above-mentioned initial count.

If the given determination bit of the counter 11 rises and the latch signal is output when detecting the reset level (during the period from time t5 to time t7), control is performed to output the full count of the counter 11 when detecting a pixel (during the period between times t8 and t9). That is, in this state, the difference calculating process (CDS) of calculating the difference between the reset level AD conversion result and pixel signal level AD conversion result is performed. If the given determination bit of the counter rises when detecting the reset level (during the period from time t5 to time t7), the latch signal is output and held in the latch circuit 14, and the pixel (PD) count is forcedly changed to a full count by taking this latch signal into account even when the comparator 8 is inverted during the pixel signal AD period. Consequently, a full signal is finally output as the signal after the difference calculating process (CDS).

Note that the digital CDS method disclosed in this embodiment is an example, and any digital CDS method can be used as long as the digital data value of a signal component indicated by the difference between the reset level and signal level can be obtained.

<Effects>

The solid-state image sensing device and its control operation according to this embodiment achieves at least the same effects as above-mentioned effects (1) and (2). In addition, the arrangement and control operation of this embodiment are applicable as needed.

Comparative Example 1

Example in which Potential of Vertical Signal Line is Controlled in Analog Manner For comparison with the solid-state image sensing devices and their control operations according to the above-mentioned embodiments, a solid-state image sensing device and its control operation according to Comparative Example 1 will be explained below with reference to FIGS. 10, 11, and 12. Comparative Example 1 is directed to an example in which when very intense excessive light enters, the potential of a vertical signal line is controlled in an analog manner so as not to drop a reset signal. In this explanation, a repetitive explanation of the embodiments and modification described above will be omitted.

Overall Configuration Example

First, an example of the overall configuration of the solid-state image sensing device according to Comparative Example 1 will be explained with reference to FIG. 10.

As shown in FIG. 10, the solid-state image sensing device according to Comparative Example 1 differs from the above-mentioned embodiments in that an AD converter includes a bias circuit 105 and reset signal controllers 106 occupying a relatively large area.

<Unit Pixel and AD Converter>

Next, configuration examples of a unit pixel and the AD converter of the solid-state image sensing device according to Comparative Example 1 will be explained below with reference to FIG. 11.

As shown in FIG. 11, Comparative Example 1 differs from the above embodiments in that the AD converter does not include the latch circuit 14, switch SW2, and OR circuit OR1.

In a read operation, a reset pulse (RST) is first supplied to the gate of a reset transistor RST Tr of a unit pixel 3, and a reset signal is output to a vertical signal line VSL. Subsequently, a comparator 108 compares this value with a reference signal VREF, and a counter 111 counts clocks (count clk) input until the two values become equal.

After that, a read pulse (READ pulse) is supplied to the gate of a read transistor READ Tr, and AD conversion is similarly performed on a pixel (PD) signal.

In this step, the counter 111 independently counts a reset level as the reference level of the pixel signal and the signal level, and converts them into digital data. A difference calculating process (CDS) is executed between the AD conversion result of the reset level and that of the signal level, and digital data of a signal component indicated by the difference between the reset level and pixel (PD) signal level is acquired as a pixel signal.

Comparative Example 1 differs from the above-mentioned embodiments in that the reset signal controller 106 controls the signal before it is input to the comparator 108.

If very intense excessive light enters, the reset transistor of a unit pixel of a selected row is turned on to drop the reset signal of the vertical signal line VSL when reading out a pixel signal. This decreases the pixel signal component formed by the difference between the reset signal and pixel (PD) signal, and generates darkened patterns in the image.

In Comparative Example 1, therefore, the reset signal controller 106 is inserted immediately before the comparator 108 compares the pixel signal acquired from a pixel array 102 with the reference signal, a given threshold voltage generated by the bias circuit 105 is applied to the signal controller 106, thereby performing, at a given timing, signal correction on the potential of the pixel reset signal supplied from the vertical signal line VSL.

<Read Control Operation>

A read control operation of the solid-state image sensing device according to Comparative Example 1 will now be explained with reference to a timing chart shown in FIG. 12.

Figure 12:
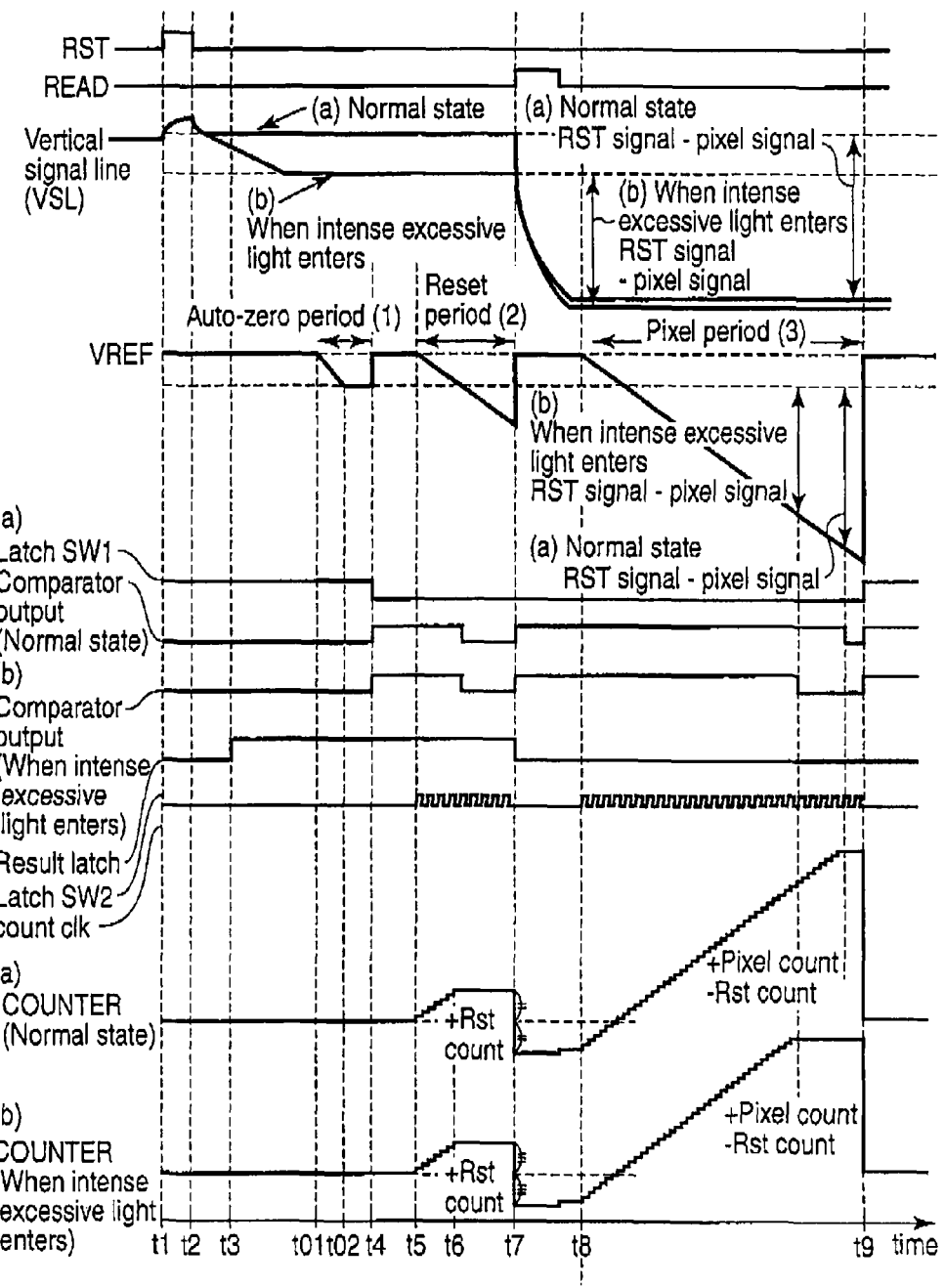
FIG. 12 is a timing chart showing a read control operation of the solid-state image sensing device according to Comparative Example 1.

As shown in FIG. 12, at time t4, for example, there is almost no reset signal drop in normal state (a). In state (b) in which very intense excessive light enters, however, the reset transistor of a unit pixel of a selected row is turned on to drop the reset signal of the vertical signal line when reading out a pixel signal. To prevent this reset signal drop, the potential of the vertical signal line VSL is controlled when acquiring the reset voltage (during the period from time t3 to time t7).

For example, as shown in FIG. 12, at time t1, after the reset pulse rises and a photodiode supplies a pixel reset signal to the vertical signal line VSL, the potential of the vertical signal line VSL is clamped by holding a clamp enable signal at "H" level so that the potential does not fall below a predetermined reference threshold voltage during the reset signal detection period of the comparator 108.

Subsequently, between times t01 and t02, auto-zero integration is started by dropping the reference voltage VREF, a reset signal is acquired by auto-zero, and the reference potential of the comparator 108 is acquired.

Then, at time t4, the comparator output is changed to "H" level by resetting the reference voltage VREF. At the same time, auto-zero period (1) is terminated by turning off an auto-zero switch SW1, and a CDS operation is started.

At time t5, reset integration is started by dropping the reference voltage VREF. At the same time, clocks are supplied to the counter 111, and the counter 111 starts counting (measuring) counter clocks (count clk).

When the reference voltage VREF becomes equal to the potential of the reset signal after that, the comparator is inverted, the counter 111 counts clocks input until that time, and the count is acquired as a reset signal.

After the reset signal is determined, the reference voltage VREF is returned to the reset voltage, and the comparator 108 is returned to the original non-inverted state.

Then, the reset count is converted into a negative reset count by inverting signals of all bits of the binary counter, and this count is used as an initial count.

After that, the comparator similarly compares a pixel (PD) signal with the reference signal, and clocks input until the time of inversion of the comparator are counted from the initial count described above, thereby acquiring the pixel count (photodiode voltage) as a pixel signal.

Note that a count bit width is pre-designed such that a pixel signal falls within the range of the count even when a full pixel signal (photodiode signal) is input (state (b)), i.e., even when a saturation signal is input.

As described above, the arrangement and its control operation of Comparative Example 1 differ from the above-mentioned embodiments and modification in that when very intense excessive light enters (state (b)), the reset signal controller 106 controls the potential of the vertical signal line VSL in an analog manner so as to prevent the reset signal from dropping. However, Comparison Example 1 is disadvantageous for downsizing because the reset signal controllers 106 and bias circuit 105 occupy a relatively large area.

Comparative Example 2

A solid-state image sensing device and its control operation according to Comparative Example 2 will be explained below with reference to FIG. 13. In this explanation, a repetitive explanation of the above-mentioned embodiments and modification will be omitted.

Overall Configuration Example

Figure 13:
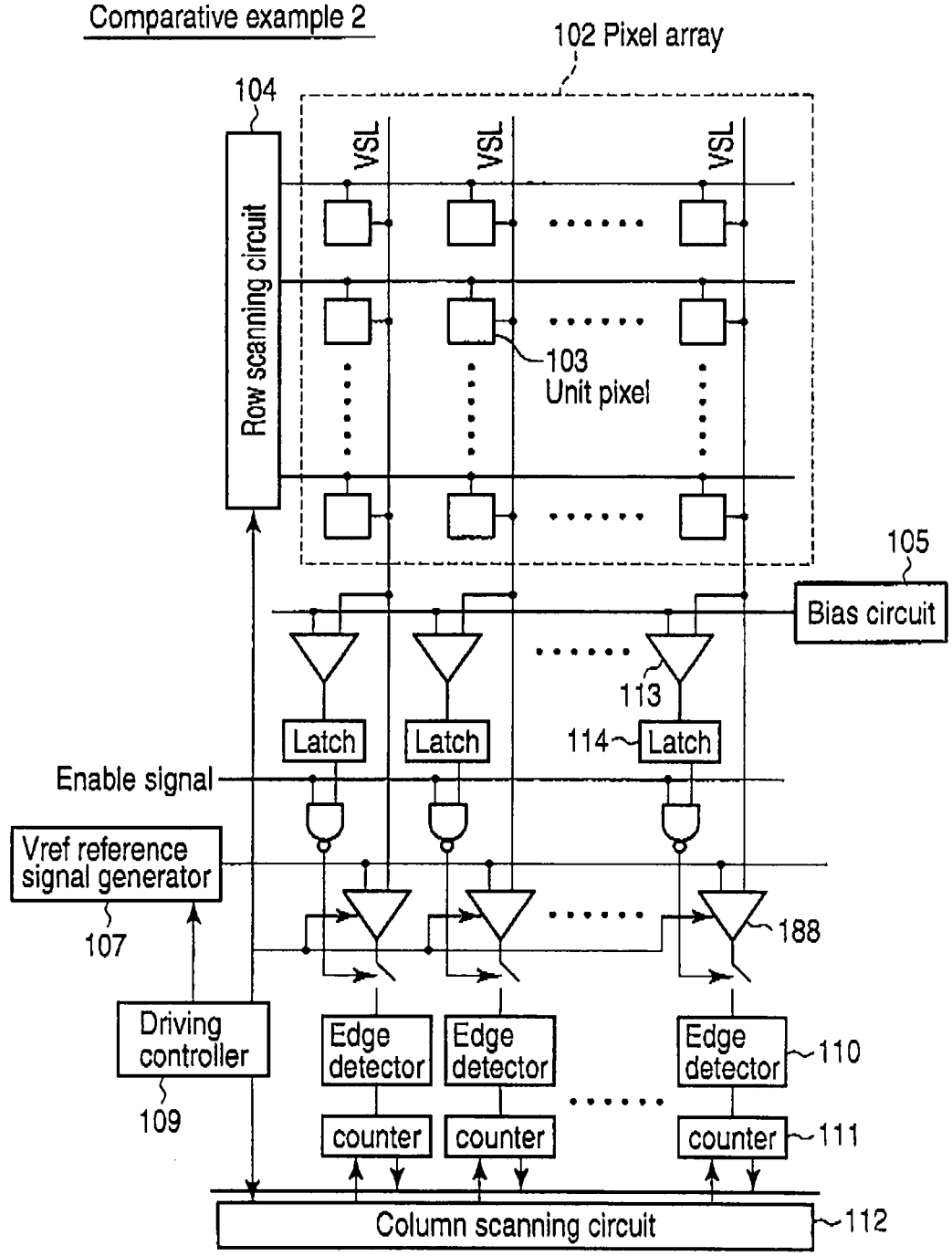
FIG. 13 is a block diagram showing an example of the overall configuration of a solid-state image sensing device according to Comparative Example 2.

FIG. 13 shows the overall configuration of the solid-state image sensing device according to Comparative Example 2.

As shown in FIG. 13, Comparative Example 2 differs from the above-mentioned configurations in that the device includes signal control comparators 113 and latch circuits 114 as reset signal controllers.

In Comparative Example 2, the signal control comparator 113 compares an output signal from a source follower circuit with a given threshold voltage when reading out a reset signal. If the reset signal exceeds the given threshold voltage, control is performed such that a pixel signal obtained after a difference calculating process (CDS) of calculating the difference between a reset level signal and pixel signal is replaced with a given signal. In this case, a given threshold voltage generated by a bias circuit is input as a reference voltage to the reset signal control comparator, and compared with the potential of the reset signal.

In the arrangements and their control operations according to Comparative Examples 1 and 2 as described above, if very intense excessive light enters (state (b)), the potential of the vertical signal line VSL is monitored when acquiring the reset level, and signal control is performed before the pixel signal undergoes AD conversion.

In this case, however, it is necessary to use, e.g., the control circuit for controlling a pixel signal transferred from the vertical signal line VSL, the bias circuit 105 for determining the threshold value of a pixel signal to be input to the control circuit, or the signal control comparator 113. This is disadvantageous in that the circuit layout area increases. This tendency is more significant in a micro-pixel parallel read type sensor because these circuits must be added to each column.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A solid-state image sensing device for reading out, via an output circuit, a reset signal and a pixel signal from a pixel unit which performs photoelectric conversion, comprising:
    a comparator which compares a signal read out from the pixel unit with a reference signal;
    a counter which counts clocks input until a pulse signal indicating a comparison result from the comparator is obtained; and
    a counter controller which prevents the counter from performing an operation of stopping pixel signal counting, based on an output result of the reset signal from the comparator.

2. The device of claim 1, wherein the counter controller comprises a latch circuit which latches an output signal from the comparator, and a latch output controller which controls an output signal from the latch circuit, allows the counter to perform the counter stopping operation by invalidating the output from the latch circuit in reset AD conversion, and prevents the counter from performing the counter stopping operation by validating the output from the latch circuit in pixel AD conversion.

3. The device of claim 1, wherein
    a redundancy corresponding to a determination threshold margin is given to a reset signal integration period of the reference signal to be compared with the signal read out from the pixel unit, and to a reset counter range, and
    the counter controller prevents the counter from performing the operation of stopping pixel signal counting, based on the output result of the reset signal from the comparator.

4. The device of claim 1, further comprising a reset signal controller installed between the pixel unit and an AD converter connected to the pixel unit via a vertical signal line.

5. The device of claim 2, wherein
    an input of the latch circuit is connected to an output of the counter, and
    the counter controller determines whether to allow the counter to perform the operation of stopping pixel signal counting, based on a counter result from the counter.

6. The device of claim 5, wherein
the counter causes the latch circuit to hold a latch signal when a state of a given bit in the counter is obtained during a reset signal detection period, and
the counter controller forcedly changes a pixel (PD) count to a full count based on a result of the latch signal, even when the comparator is inverted during a pixel signal AD period.

7. A solid-state image sensing device for reading out, via an output circuit, a reset signal and a pixel signal from a pixel unit which performs photoelectric conversion, comprising:
a comparator which compares a signal read out from the pixel unit with a reference signal;
a counter which counts clocks input until a pulse signal indicating a comparison result from the comparator is obtained; and
a counter controller which prevents the counter from performing an operation of stopping pixel signal counting, based on a counter result of the reset signal.

8. The device of claim 7, wherein the counter controller comprises a latch circuit which latches a predetermined signal of the counter, and a latch output controller which controls an output signal from the latch circuit, and the counter controller allows the counter to perform the counter stopping operation by invalidating the output from the latch circuit in reset AD conversion, and prevents the counter from performing the counter stopping operation by validating the output from the latch circuit in pixel AD conversion.

9. The device of claim 7, wherein
a redundancy corresponding to a determination threshold margin is given to a reset signal integration period of the reference signal to be compared with the signal read out from the pixel unit, and to a reset counter range, and
the counter controller prevents the counter from performing the operation of stopping pixel signal counting, based on an output result from the counter.

10. The device of claim 7, further comprising a reset signal controller installed between the pixel unit and an AD converter connected to the pixel unit via a vertical signal line.

11. The device of claim 8, wherein
an input of the latch circuit is connected to an output of the counter, and
the counter controller determines whether to allow the counter to perform the operation of stopping pixel signal counting, based on a counter result from the counter.

12. The device of claim 11, wherein
the counter causes the latch circuit to hold a latch signal when a state of a given bit in the counter is obtained during a reset signal detection period, and
the counter controller forcedly changes a pixel (PD) count to a full count based on a result of the latch signal, even when the comparator is inverted during a pixel signal AD period.

13. A control method to be performed for a solid-state image sensing device which reads out a reset signal from a pixel unit which performs photoelectric conversion, reads out, via an output circuit, a pixel signal from a photodiode which performs photoelectric conversion, and comprises a comparator which compares a signal read out from the pixel unit with a reference signal, wherein
in an counter AD converting operation of counting clocks input until a pulse signal indicating a comparison result from the comparator is obtained,
the counter is prevented from performing an operation of stopping pixel signal counting, based on one of an output result of the reset signal from the comparator and a count result from the comparator.

14. The method of claim 13, wherein the solid-state image sensing device further comprises a counter controller comprising a latch circuit which latches an output signal from the comparator, and a latch output controller which controls an output signal from the latch circuit, and the counter controller allows the counter to perform the counter stopping operation by invalidating the output from the latch circuit in reset AD conversion, and prevents the counter from performing the counter stopping operation by validating the output from the latch circuit in pixel AD conversion.

15. The method of claim 14, wherein
a redundancy corresponding to a determination threshold margin is given to a reset signal integration period of the reference signal to be compared with the signal read out from the pixel unit, and to a reset counter range, and
the counter controller prevents the counter from performing the operation of stopping pixel signal counting, based on the output result of the reset signal from the comparator.

16. The method of claim 14, wherein
an input of the latch circuit is connected to an output of the counter, and
the counter controller determines whether to allow the counter to perform the operation of stopping pixel signal counting, based on a counter result from the counter.

17. The method of claim 16, wherein
the counter causes the latch circuit to hold a latch signal when a state of a given bit in the counter is obtained during a reset signal detection period, and
the counter controller forcedly changes a pixel (PD) count to a full count based on a result of the latch signal, even when the comparator is inverted during a pixel signal AD period.

18. The method of claim 13, wherein the solid-state image sensing device further comprises a reset signal controller installed between the pixel unit and an AD converter connected to the pixel unit via a vertical signal line.

* * * * *